United States Patent [19]
Lorenz

[11] Patent Number: 5,892,922
[45] Date of Patent: Apr. 6, 1999

[54] VIRTUAL LOCAL AREA NETWORK MEMORY ACCESS SYSTEM

[75] Inventor: Gary D. Lorenz, Acton, Mass.

[73] Assignee: 3Com Corporation, Santa Clara, Calif.

[21] Appl. No.: 808,021

[22] Filed: Feb. 28, 1997

[51] Int. Cl.⁶ .................................................. G06F 15/16
[52] U.S. Cl. ...................... 395/200.68; 395/200; 395/68; 395/72; 395/62; 370/85; 370/13
[58] Field of Search ............................ 375/118; 395/802, 395/425, 308, 500, 335, 200.62; 370/249, 391, 85.13, 60, 397; 340/172.5; 364/900, 200; 179/15; 570/397; 711/167

[56] References Cited

U.S. PATENT DOCUMENTS

| | | | |
|---|---|---|---|
| 5,050,165 | 9/1991 | Yoshioka et al. | 370/85.13 |
| 5,367,643 | 11/1994 | Chang et al. | 395/325 |
| 5,544,162 | 8/1996 | Mraz et al. | 370/60 |
| 5,555,395 | 9/1996 | Parks | 395/472 |
| 5,583,862 | 12/1996 | Callon | 370/397 |
| 5,737,525 | 4/1998 | Picazo, Jr. et al. | 395/200.02 |
| 5,751,971 | 5/1998 | Dobbins et al. | 395/200.68 |
| 5,751,999 | 5/1998 | Suzuki | 395/494 |
| 5,802,278 | 9/1998 | Isfeld et al. | 395/200.02 |
| 5,813,041 | 9/1998 | McIntyre, Jr. et al. | 711/167 |

OTHER PUBLICATIONS

Internetworking with ATM–based Switched Virtual Networks, K.Ghane .Http://alep.ac.upc.es/HMP/Paper, May 8, 1995.

Cisco VLAN Roadmap. www. cisco.com/warp/public/538/7.html, Jul. 17, 1995.

VLAN Interoperability. www.cisco.com/warp.public/538/6.html. Jul. 14, 1995.

VLAN and Routers. www.cisco.com/warp/public/741/10.html, Jan. 8, 1997.

*Primary Examiner*—Frank J. Asta
*Assistant Examiner*—Thong Vu
*Attorney, Agent, or Firm*—McGlew and Tuttle, P.C.

[57] ABSTRACT

A VLAN memory access system to provide VLAN address table look-ups with the ability to simultaneously do processor read cycles or processor write cycles to the same memory structure with anatomical accesses. The system encompasses the interaction between a memory look-up table that stores the slot allowed transition bit mask for a multi-slot hub based VLAN switch, a switch processor interface that is used to upgrade the memory access table by writing entries into the table or reading the table to verify its contents, and a look-up processor that uses the VLAN table to make forwarding decisions on the destination of a packet based on the value read from the VLAN memory look-up table. The VLAN table accesses must be arbitrated between the look-up processor, which has the highest priority, and read or write accesses from the switch processor. The look-up processor takes the VLAN ID field of a packet and uses this as the address of the slot allowed transmit bit mask to be applied to the destination slot bit mask. This logical AND function is used to determine the final bit mask of slots that will receive this packet.

19 Claims, 6 Drawing Sheets

VIRTUAL LOCAL AREA NETWORK MEMORY ACCESS SYSTEM

FIELD OF THE INVENTION

The present invention relates to a virtual local area network (VLAN) system where packets are redirected in a switch according to a look-up table. In particular the present invention relates to a system for using a memory look-up table to redirect packets, while at the same time updating and maintaining the look-up table without access conflicts.

BACKGROUND OF THE INVENTION

In a local area network (LAN) information is sent from workstation to workstation in the form of packets. Each packet contains a header and data portion. The header portion contains control type information such as destination address, source address, the type of information being transferred, and error correcting codes. The data portion contains the actual information to be transferred from one workstation to another.

Workstations are connected to each other over a medium such as wire cables or fiber optic cables. The cables usually lead from the individual workstations to a hub or concentrator. The plurality of workstations connected to a single concentrator is often known as a segment. A plurality of segments, each having their own concentrator, can be connected to each other by connecting the concentrators.

One of the simpler embodiments of a concentrator is provided with only a repeater function. Any packet that is received by a repeater from a workstation is sent out to all other workstations connected to the repeater. When a plurality of segments, each having repeaters, are connected to each other, a packet generated by one workstation is spread throughout the entire LAN. The destination address of the workstation to receive the packet is included in the header of the packet. Workstations that are not to receive the packet, disregard or ignore the packet.

As the number of segments and workstations increase on a LAN, the number of packets traversing the LAN, or the traffic, also increases. With all the workstations and segments connected by repeaters, the packets going to all workstations causes delays for the packets and a corresponding lowering of performance of the network.

Bridges and routers are known to connect segments and only transfer packets from one segment to another segment if the destination address of the packet is on the other segment. Otherwise a packet will not be delivered into a segment.

Routers are more sophisticated than bridges and can route packets according to additional conditions. Routers are also more complicated and more expensive than bridges or repeaters. Correspondingly, bridges are more complicated and more expensive than repeaters.

Very often it is desirable to provide individual groups of workstations within a single segment, or to have a single group encompass several segments. Also, it may be desirable to have several different groups each contain separate portions of several different segments. The routing of packets to only members of the same group can become very complicated and expensive if routers are used. Also very often a single workstation will send a multi-cast or broadcast packet intended for all members of its own group. With traditional bridges and routers, a broadcast packet would go to all members of all groups. This is not desirable since it needlessly increases traffic and may also be undesirable from a security view point.

Also when a workstation is moved, or a person wants to move to a different workstation and still receive their same information, reconfiguration of a router is very involved. The same is true when additional workstations must be added to a router's configuration, or a particular workstation wants to be associated with a different group of workstations on the LAN.

SUMMARY AND OBJECTS OF THE INVENTION

It is an object of the present invention to overcome the problem of excessive traffic on a LAN by subdividing the individual workstations into groups of workstations or VLAN's. Packet traffic is only directed to the destination workstations, and broadcast packets only go to workstations of the desired VLAN. Moving a workstation or person to another physical location on a LAN, but still maintaining their same address is much simpler in the present invention. Adding additional workstations to a VLAN, or changing a workstation to a different VLAN is much easier in the present invention.

The present invention accomplishes this by adding a VLAN ID field to each packet or by associating a port with a particular VLAN ID field. The packets are then sent from a workstation to a VLAN switch. In the VLAN switch, the VLAN ID field is read. The VLAN switch contains information indicating where a packet from a particular VLAN is to be sent to reach the correct VLAN and workstation. The VLAN switch then property directs the packet based on the information stored in the VLAN switch.

VLAN information is stored in the VLAN switch in a memory address look-up table. When a packet comes in, its VLAN ID field is used as an address in the memory address look-up table, and the data in that address is then read out and used to redirect the packet. A VLAN controller reads the VLAN ID field from the VLAN packet, goes to the corresponding address in the memory look-up table, reads the data in that address and then the VLAN controller redirects the packet. This operation can happen many times a second and can be completely random.

The memory look-up table also needs to be updated and maintained while the VLAN controller is performing the VLAN look-up process. This causes two separate entities to be reading and writing the memory look-up table at possibly the same time. Errors can occur if one entity interrupts in the middle of an operation of the other entity.

The present invention provides a system which prevents one entity from interfering in the middle of the operation of the other entity. This system involves two separate state machines, namely a first state machine referred to herein as a req_arb state machine and a second state machine referred to herein as a VFI state machine. The req_arb state machine has the states idle, look-up also referred to as gbi, and processor also referred to as proc. The VFI state machine has an off state, a read state and a write state.

The VLAN look-up controller, or process, generates a look-up signal, also referred to as a read-request signal or ftt_read_req signal, when the VLAN look-up process needs to process an incoming packet. The switch processor which updates and maintains the memory look-up table generates a processor request signal, also referred to as a proc-request signal, when the switch processor needs to read and write to the memory look-up table. The switch processor also generates a read signal where the switch processor needs to read from the memory look-up table. The switch processor also generates a write signal when the switch processor needs to write to the memory look-up table. The req_arb state machine goes into the idle state when the read-request signal and the proc-request signal are not present or not active. The req_arb state machine goes into the gbi state when the read-request signal is present or active. The req_arb state machine goes into the proc state when the read-request signal is not present and the proc-request signal is present.

The VFI state machine transitions between states based on conditions A and B. Condition A is present when the gbi state is active or (the proc state is active and the read signal is present). The logic statements in the parenthesis are performed first and the outcome is then logically or'ed with the fact if the gbi state is active. Condition B is present when the proc state is active and the write signal is present. The VFI state machine goes into the read state when condition A is present. The VFI state machine goes into the write state when condition A is not present and condition B is present. The VFI state machine goes into the off state when conditions A and B are not present. Also any combinations of the above signals which are not defined cause the present invention to go into the idle state and the off state.

In this way the VLAN process is given priority and performance of the network does not suffer. Also the switch processor is able to maintain an update in the memory look-up table without interfering with the VLAN look-up process, or the VLAN look-up process interfering with the switch processor.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
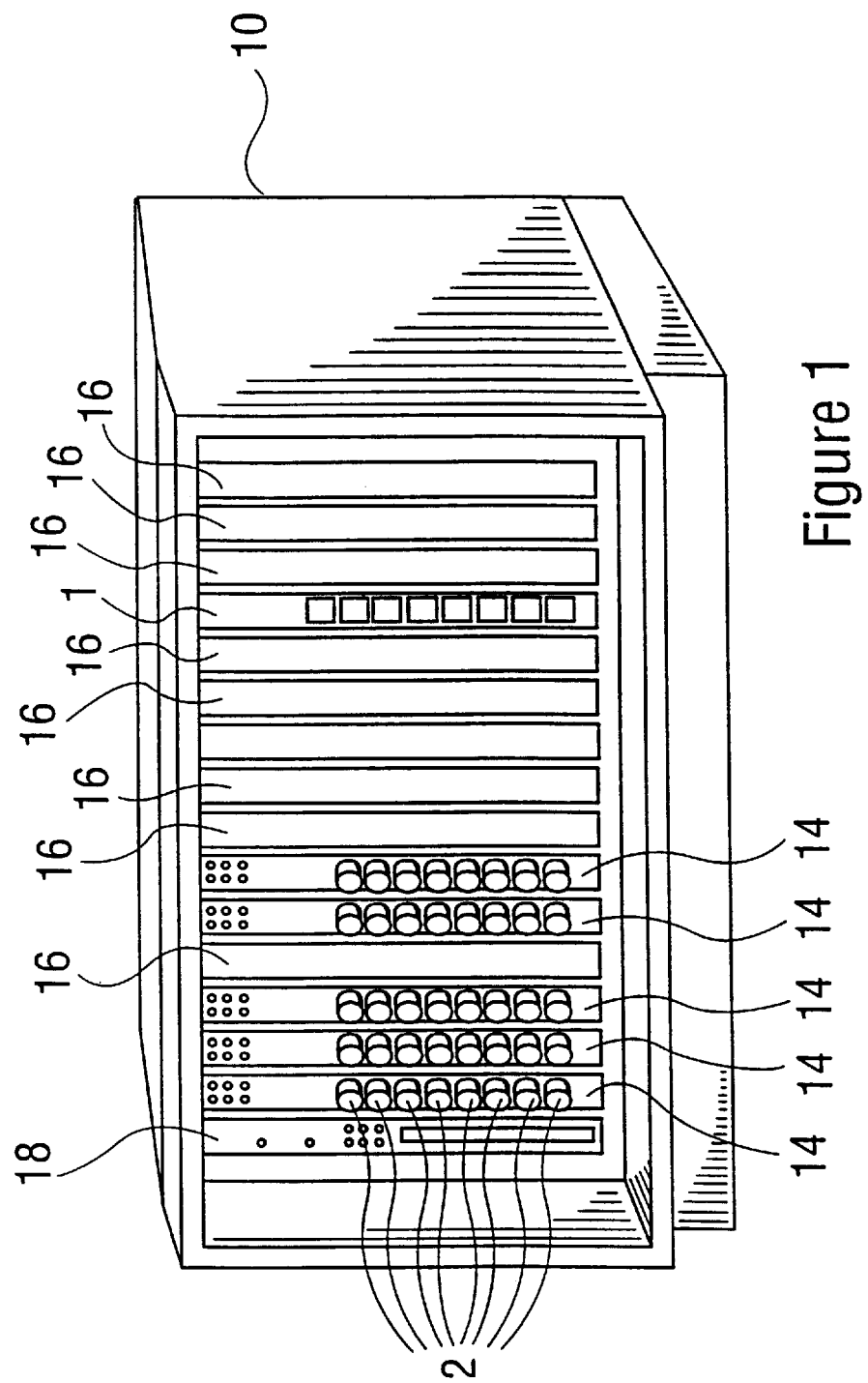
FIG. 1 is a view of a hub or concentrator for connecting a plurality of workstations.
Figure 2:
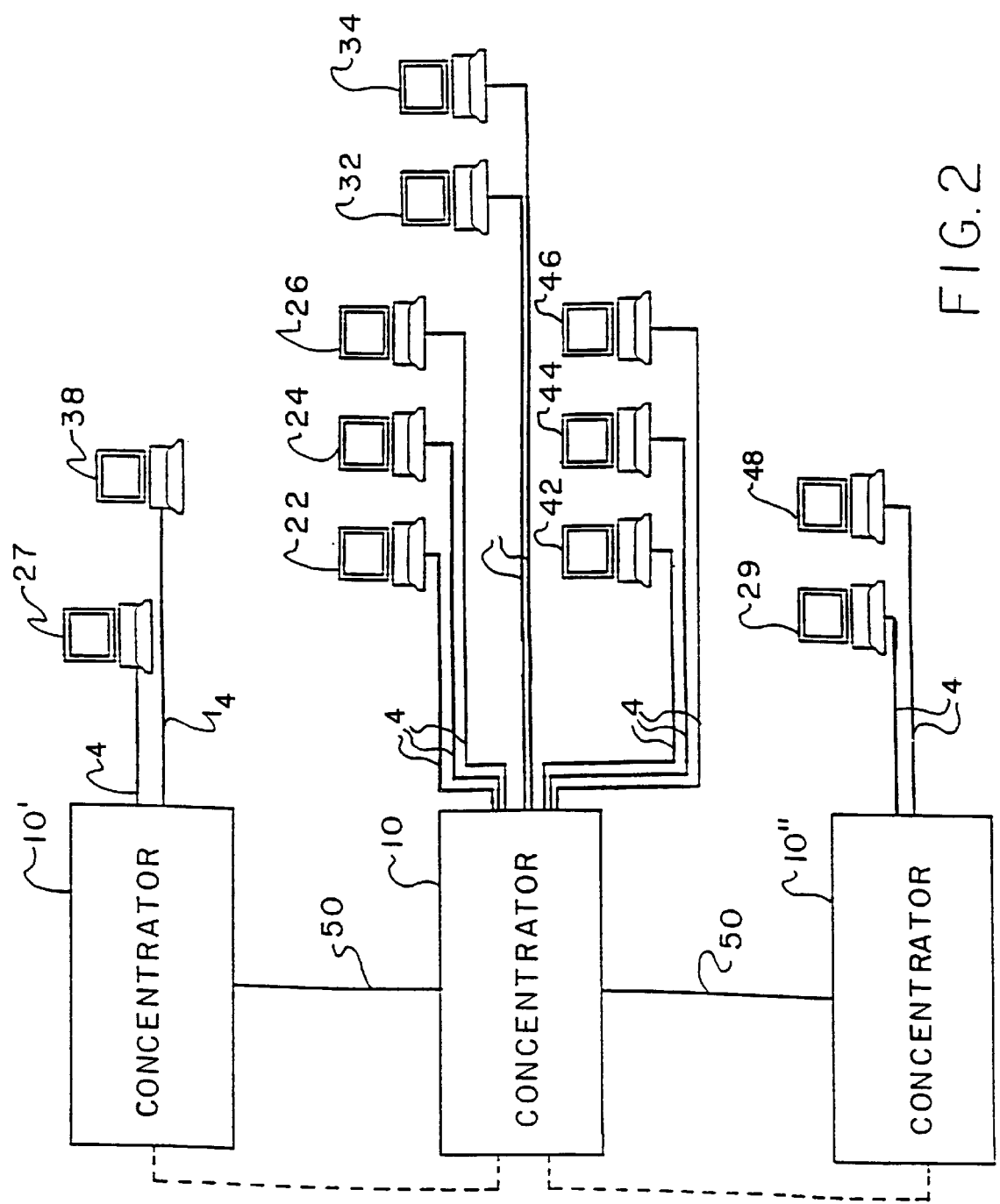
FIG. 2 is a schematic view of a plurality of workstations connected to a plurality of concentrators.

Referring to the figures, and especially FIG. 1, a hub or concentrator 10 contains a plurality of slots 16. Media modules 14 can be placed into these slots. Each media module 14 has a plurality of ports 2 for connection to workstations, as shown in FIG. 2.

The concentrator 10 can be connected to other concentrators 10' and 10" over a medium 50 which could be similar to medium 4. FIG. 2 shows a LAN with three concentrators and their corresponding segments. The present invention further subdivides the LAN into a plurality of VLAN's. Workstations 22, 24, 26, 27 and 29 call be considered to be a first VLAN, workstations 32, 34 and 38 can be considered to be a second VLAN and workstations 42, 44, 46 and 48 can be considered to be a third VLAN. In order to reduce traffic and increase security, it is desirable that packets from one VLAN are not sent to workstations on another VLAN, especially broadcast packets from one of the VLAN's.

Figure 3:
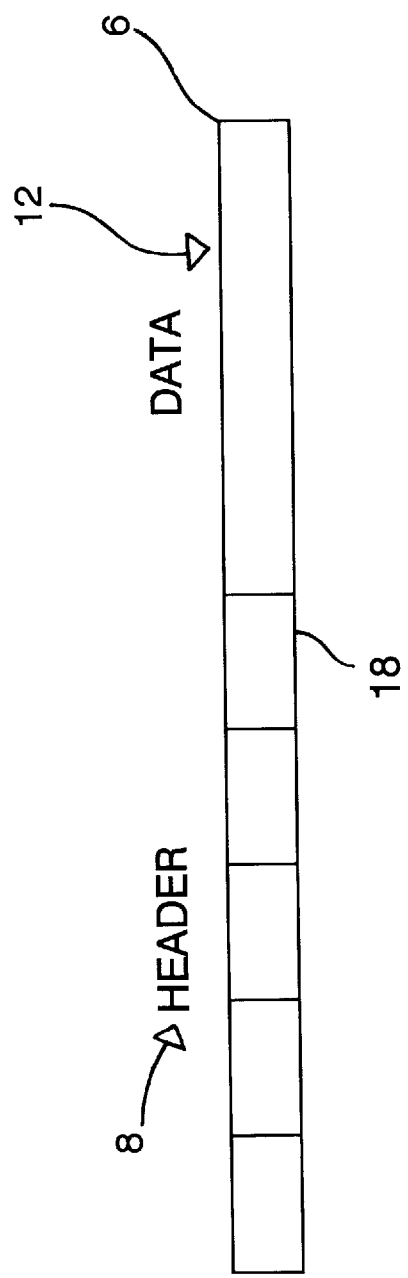
FIG. 3 is a diagram of a packet.

Each packet 6 has a header portion 8 and a data portion 12 (FIG. 3). In the packet is a VLAN ID field 18.

Figure 4:
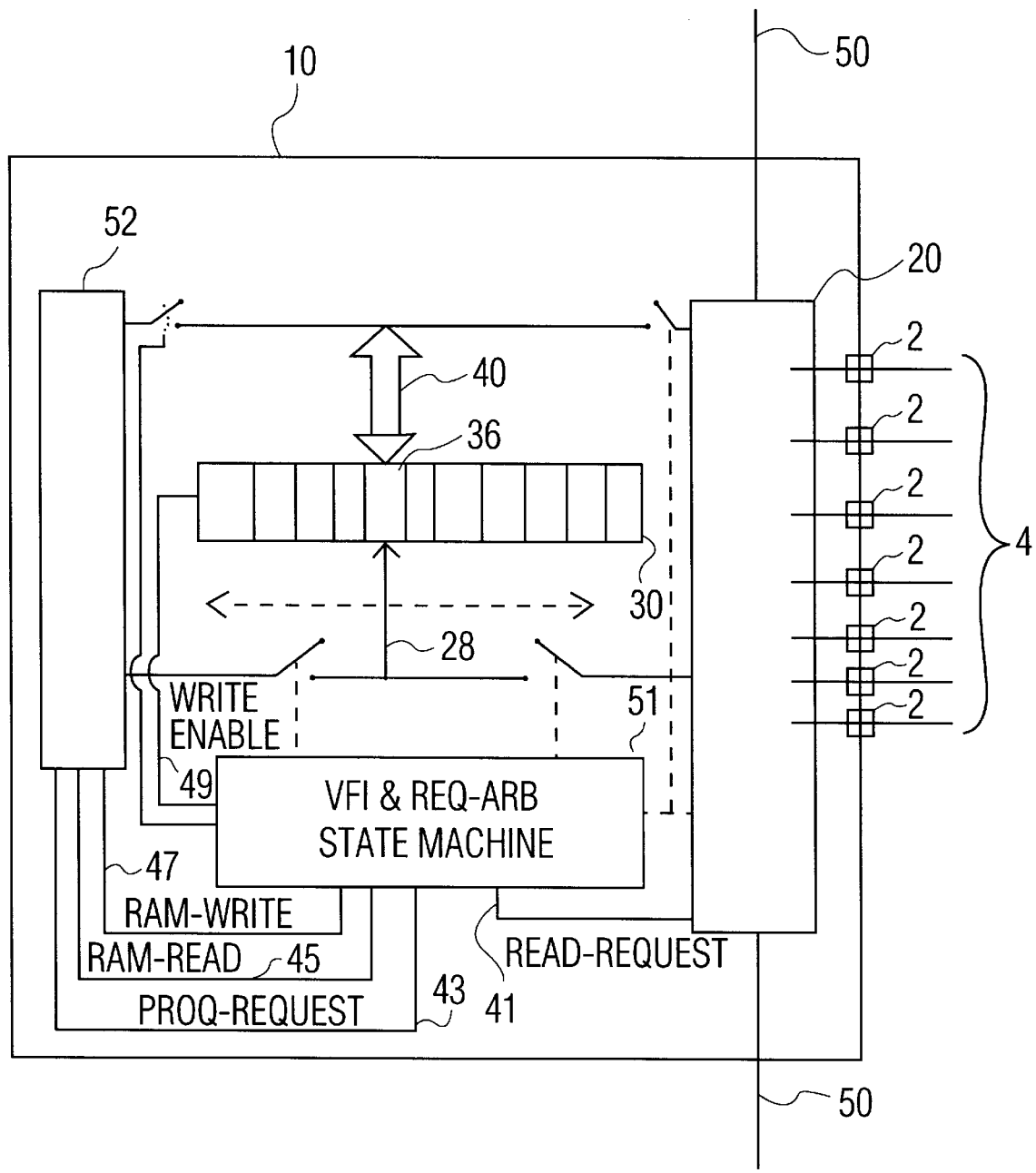
FIG. 4 is a schematic view of the inside of the hub or concentrator.

The concentrator 10 in the present invention is a VLAN switch which contains a VLAN controller means 20 for redirecting the packets onto the proper medium 4 or 50 (FIG. 4). The VLAN controller means reads the VLAN ID field 18 of an incoming VLAN packet and uses the value in the VLAN ID field to properly position an address pointer 28 to a corresponding memory location 36 in a memory look-up table 30. Data from the look-up address indicated by pointer 28 is then transferred in and out of the memory look-up address 36 by an input/output (I/O) means 40. The VLAN controller means uses the look-up data from the I/O means 40 and the look-up address 36 to determine how the incoming packet should be directed.

The memory look-up table 30 needs to be initialized, maintained and updated. It is desirable that all of these functions be performed while the VLAN switch 10 is functional and redirecting packets. A switch processor 52 initializes, updates and maintains the memory-look up table 30. In order for the switch processor to operate, it must perform read and write operations which could interfere with the read operations of the VLAN controller means 20. It is very desirable that the memory look-up table be updated without having to significantly stop traffic on the LAN, and without causing errors in operation of either the VLAN controller means or the switch processor 52.

When the VLAN controller means 20 needs to read information from the memory look-up table, the VLAN controller means 20 generates a read-request signal 41. When the switch processor needs to read or write to the memory look-up table, the switch processor generates a proc-request signal 43. Further when the switch processor 52 needs to read from the memory look-up table 30, the switch processor 52 generates a RAM read signal 45. When the switch processor 52 needs to write to the memory look-up table 30, the switch processor 52 generates a RAM write signal 47.

The read-request signal 41, the proc-request signal 43, the RAM read signal 45 and the RAM write signal 47 are all received by a state machine 51.

Figure 5:
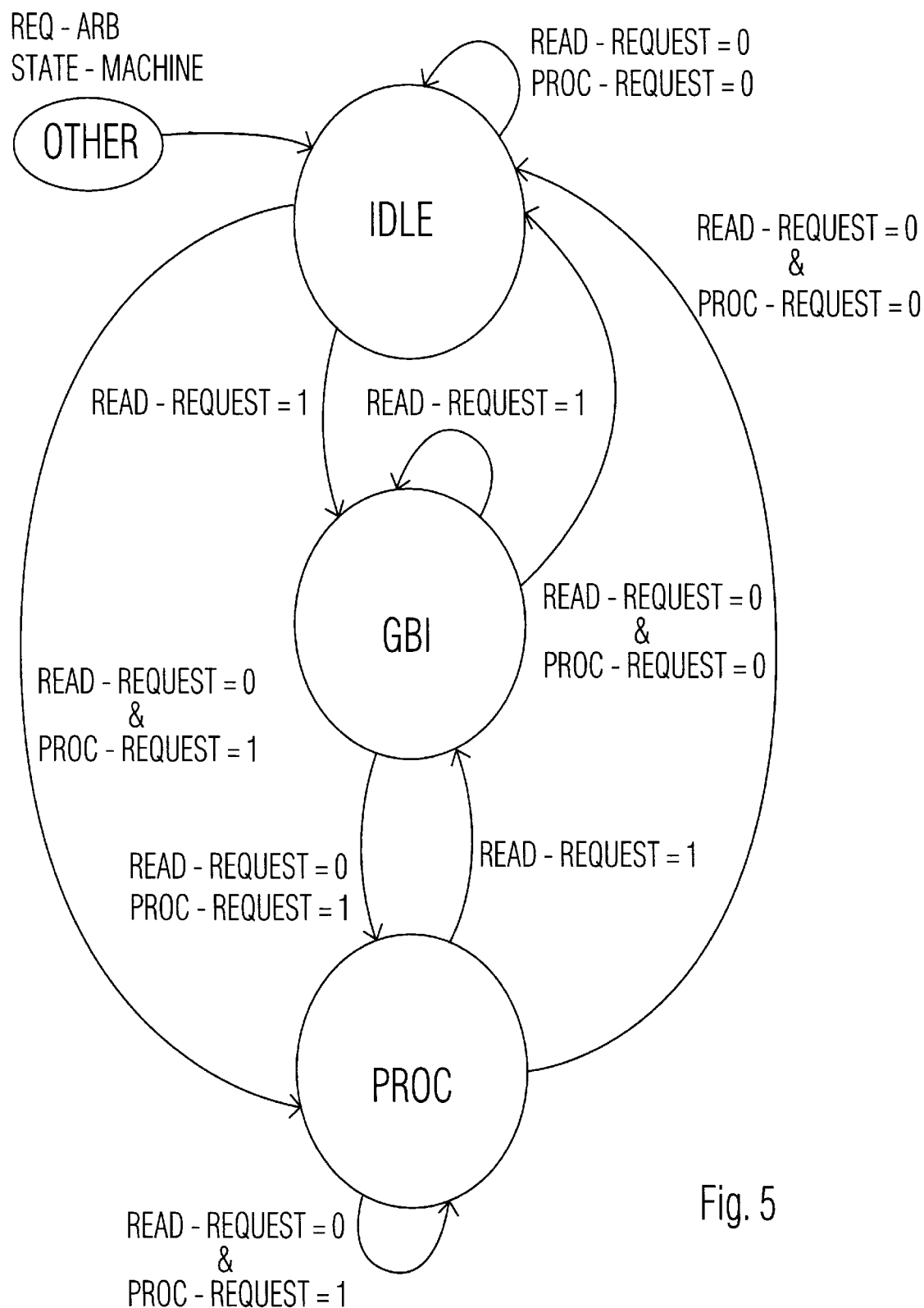
FIG. 5 is a diagram of the req_arb state machine.
Figure 6:
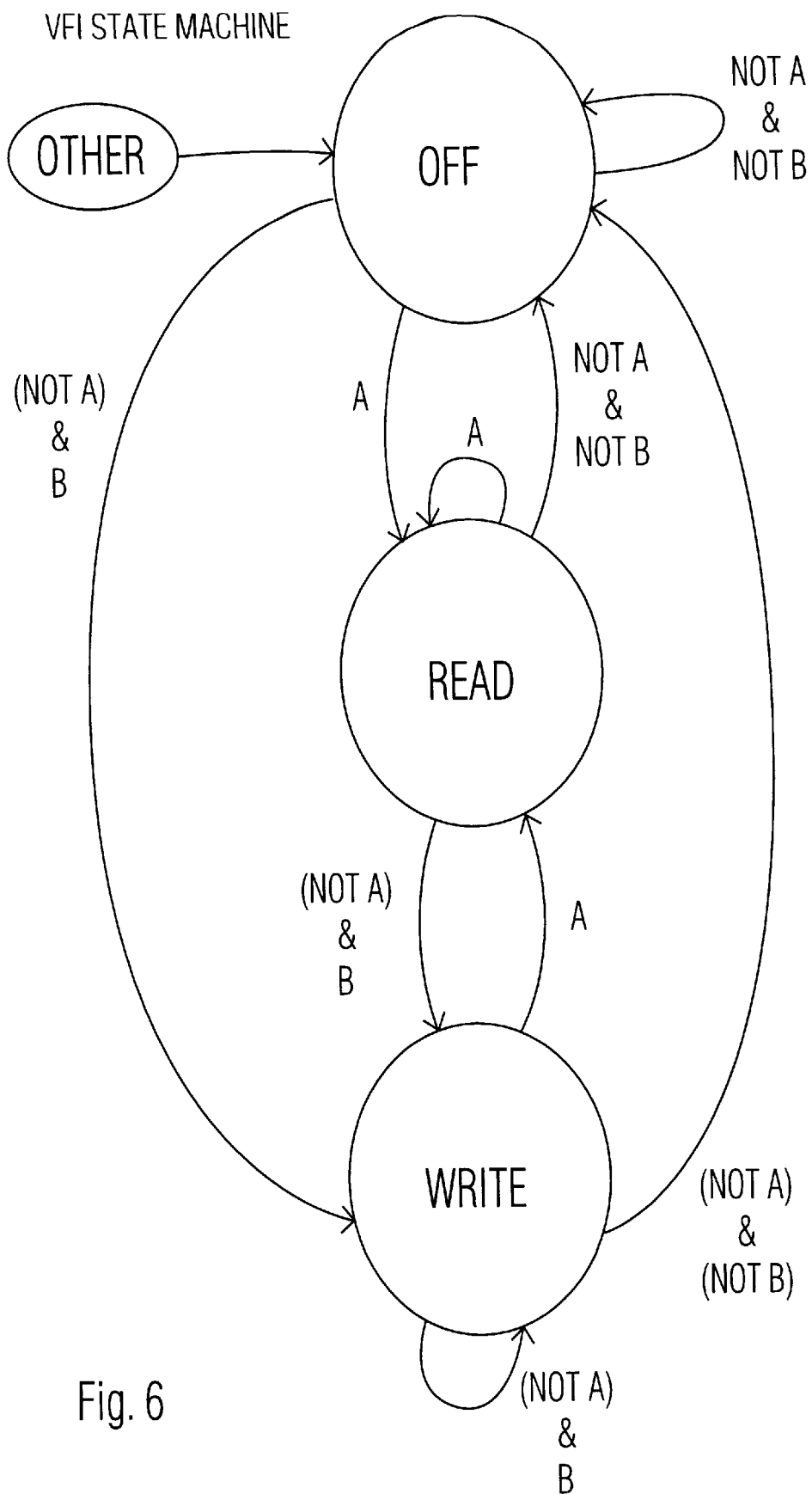
FIG. 6 is a diagram of the VFI state machine.

The state machine 51 actually contains two separate state machines, a req_arb state machine represented in FIG. 5 and a VFI state machine represented by FIG. 6.

The req_arb state machine goes into the gbi state when the read-request signal is present or active. The req_arb state machine goes into the proc state when the read-request signal is not present and the proc-request signal is present. When both the read-request signal and the proc-request signal are not present, or in any other undefined set of conditions, the req_arb state machine goes into the idle state.

When the req_arb state machine is in the gbi state, the VLAN controller means 20 controls the address pointer 28 of the memory look-up table 30. The address pointer 28 is then directed to the address equaling the VLAN ID field of the present packet. The output of the memory look-up table 30 in this state is the VLAN ID field of the packet that requires a VLAN address look-up. Any access from the processor, read or write, is stalled until the look-up is completed. When the req_arb state machine is in the proc state, the switch processor 52 controls the location of the address pointer 28. The address pointer 28 is then directed to a memory location designated by the switch processor 52. The output of the look-up table 30 in this state is the address location that the processor is accessing with either a read or write cycle. The processor access will take only one cycle so as to guarantee that a request from the VLAN controller means 20 can be accomplished for a VLAN address look-up from a next packet.

In the idle state, the address pointer 28 is not set to an address of any significance with regard to the VLAN controller or the switch processor. The address pointer 28 can be set to a non-significant address such as "00000000".

The VFI state machine as represented by FIG. 6, has an off state, a read state and a write state. The VFI state machine transitions between the states based on conditions A and B. Condition A is present when the gbi state is active or (the proc state is active and the RAM read signal is present). Again, the logic operation inside the parenthesis is performed first. Condition B is present when the proc state is active and the RAM write signal is present. The VFI state machine goes into the read state when condition A is present. The VFI state machine goes into the write state when condition A is not present and condition B is present. The VFI state machine goes into the off state when conditions A and B are not present. Also any combination of the above signals which are not defined causes the VFI state machine to go into the off state.

When the VFI machine is in the write state, the state machine 51 generates a write enable signal 49 which is sent to the memory look-up table 30. This enables data from the switch processor 52 to be written into the memory look-up table 30. When the off or read state is active in the state machine 51, the write enable signal is not present or active.

When the read and gbi state is active, data from the memory look-up table 30 is accepted by the VLAN controller 20. When the read and proc states are active, data from the memory look-up table 30 is read by the switch processor 52.

In each of the req_arb and VFI state machines, only one of the states is active at any one time.

The present invention thus gives priority to read requests from the VLAN controller with requests from the switch processor being processed when there are no requests from the VLAN controller. The states change in the state machine at the transition from one processing cycle to another. During a processing cycle, the states remain in their present state until the end of the cycle, where the new states are then determined by new input conditions. In this way activities of the switch processor 52 and the VLAN controller 20 do not interfere with each other during the middle of an operation. In this way the present invention is able to maintain system performance, while at the same time updating and maintaining a look-up table while the network is operational.

Attached as an Appendix, is software code implementing the present invention.

While specific embodiments of the invention have been shown and described in detail to illustrate the application of the principles of the invention, it will be understood that the invention may be embodied otherwise without departing from such principles.

```
--*****************************************************************
-- model vfi.vhdl
--
-- description: this model serves as an interface between the
-- vfr model, pci model and the ftt models for use in vlan
-- multicast filtering.
--
--*****************************************************************
-- history:
--
-- 0 09-20-94 gl - original
-- 1 09-29-94 gl - first compiled version of model.
-- 2 10-07-94 gl - changed data bus to seperate inputs & outputs.
-- 3 10-19-94 gl - added iresetl and fixed initialization of signals.
-- 4 10-28-94 gl - replaced pci_gmc_enb with iresetl in all equations.
-- 5 11-08-94 FI - changed initialization of arb_state state machine.
-- 6 11-13-94 gl - changed name of model and replaced 32 MHz clock with
--                25 MHz clock since model now interfaces to FTT block.
-- 7 11-30-94 gl - made changes for synopsys compile.
-- 8 12-14-94 gl - added flip flops to hold write data into ram.
-- 9 01-05-95 FI - added scan test input added test_mode input to latch, and
--                changed latch for insert_to
-- 10 01-14-95 FI - made change to keep vn_wrenl asserted in test mode
-- 11 01-30-95 FI - added control for ramtest mode
-- 12 02-08-95 FI - added wrenl_in input, changed reset to asynchronous
-- 13 02-23-95 gl - fixed arbitration bugs in state machines and fixed
--                delayed processor cycle access.
-- 14 02-24-95 gl - fixed clearing of processor accesses.
--
--*****************************************************************
library ieee;
use ieee.std_logic_1164.all;
library parts;
use parts.std_logic_unsigned.all;
entity vfi is
port (
        vfi_data            :       out std_logic_vector(16 downto 0);
        vfi_ramtest_data    :       out std_logic_vector(16 downto 0);
        vfi_wrenl           :       out std_logic;
        vfi_addr            :       out std_logic_vector(7 downto 0);
        vfi_multicast_mask  :       out std_logic_vector(16 downto 0);
```

```
            vfi_multicast_valid     :        out std_logic;
            vfi_read_bus            :               out std_logic_vector(15 downto 0);
        test_so          :               out std_logic;
            vfr_data            :        in std_logic_vector(16 downto 0);
            ftt_vlan_id         :        in std_logic_vector(7 downto 0);
            ftt_read_reg        :        in std_logic;
        pci_wr_vfi_data         :        in std_logic;
        pci_wr_vfi_datb         :        in std_logic;
        pci_vfr_wr_strobe       :        in std_logic;
        pci_vfr_rd_strobe       :        in std_logic;
            pci_vfi_addr        :        in std_logic_vector(7 downto 0);
            pci_wdata           :               in std_logic_vector(15 downto 0);
        pci_read_addr           :        in std_logic;
        pci_gmc_enb             :        in std_logic;
        pci_ramtest_write       :        in std_logic;
        pci_ramtest_read_vfi    :        in std_logic;
            ramtest_write_data  :        in std_logic_vector(16 downto 0);
        wrenl_in                :        in std_logic;
        test_mode               :        in std_logic;
        test_se         :        in std_logic;
        test_si         :        in std_logic;
        isymclk         :        in std_logic;
        iresetl         :        in std_logic);
end vfi;
architecture behavior of vfi is
type vfistatetype is (off, read, write);
type req_arb_statetype is (idle, gbi, proc);
signal vfi_stateq, vfi_stated : vfistatetype;
signal req_arb_stateq, req_arb_stated: req_arb_statetype;
signal ram_wr_strobeq       : std_logic;
signal ram_rd_strobeq       : std_logic;
signal holding_wr_strobeq   : std_logic;
signal holding_reg_strobeq  : std_logic;
signal ram_wr_strobed       : std_logic;
signal ram_rd_strobed       : std_logic;
signal holding_wr_strobed   : std_logic;
signal holding_reg_strobed  : std_logic;
-- gbus multicast filter reg a
signal multicast_filter_regaq   : std_logic_vector(15 downto 0);
signal multicast_filter_regad   : std_logic_vector(15 downto 0);
-- gbus multicast filter reg b
signal multicast_filter_regbq   : std_logic;
signal multicast_filter_regbd   : std_logic;
-- holding reg a
signal holding_regaq        : std_logic_vector(15 downto 0);
signal holding_regad        : std_logic_vector(15 downto 0);
- holding reg b
signal holding_regbq        : std_logic;
signal holding_regbd        : std_logic;
-- write address latch signals
signal next_addr_sig        : std_logic_vector(7 downto 0);
signal ramtest_addrq        : std_logic_vector(8 downto 0);
signal ramtest_addrd        : std_logic_vector(8 downto 0);
constant read_ram_data      :       std_logic := '1';
constant read_ram_datb      :       std_logic := '0';
constant addr_zero      : std_logic_vector(7 downto 0) := "00000000";
constant data_zero    : std_logic_vector(16 downto 0) := "00000000000000000";
constant false      : std_logic := "0";
constant true       : std_logic := "1";
constant low        : std_logic := "0";
constant high       : std_logic := "1";
constant deasserted_low     :   std_logic := "0";
constant asserted_high      :   std_logic := "1";
constant asserted_low       :   std_logic := "0";
constant deasserted_high    :   std_logic := "1";
begin
combo: process
(vfr_data,ftt_vlan_id,ftt_read_req,pci_wr_vfi_data,pci_wr_vfi_datb
pci_vfr_wr_strobe,pci vfr_rd_strobe,pci_vfi_addr,pci_wdata,
pci_read_addr,pci_gmc_enb,pci_ramtest_write,pci_ramtest_read_vfi
ramtest_write_data,isymclk,req_arb_state_vfi_stateq,
ram_wr_strobeq,ram_rd_strobeq,holding_wr_strobeq,
holding_reg_strobeq,multicast_filter_regaq,multicast_filter_regbq,
holding_regaq,holding_regbq,ramtest_addrq,test_mode)
variable read_bus       : std_logic_vector(15 downto 0);
variable wrenl          : std_logic;
variable wrenl_or_clk       : std_logic;
variable req_arb_state      : req_arb_statetype;
variable proc_request       : std_logic;
variable next_addr          : std_logic_vector(7 downto 0);
```

```
variable out_data          : std_logic_vector(16 downto 0);
variable multicast_valid   : std_logic;
variable multicast_mask    : std_logic_vector(16 downto 0);
variable mask_or_bypass    : std_logic_vector(16 downto 0);
begin
- gbus multicast filter reg a
if pci_wr_vfi_data = asserted_high then
    multicast_filter_regad <= pci_wdata(15 downto 0);
elsif holding_wr_strobeq = asserted_high then
    multicast_filter_regad <= holding_regaq;
else
    multicast_filter_regad <= multicast_filter_regaq;
end if;
- gbus multicast filter reg b
if pci_wr_vfi_datb = asserted_high then
    multicast_filter_regbd <= pci_wdata(0);
elsif holding_wr_strobeq = asserted_high then
    multicast_filter_regbd <= holding_regbq;
else
    multicast_filter_regbd <= multicast_filter_regbq;
end if;
case pci_read_addr is
    when read_ram_data =>
        read_bus := multicast_filter_regaq(15 downto 0);
    when read_ram_datb =>
        read_bus := ("000000000000000" & multicast_filter_regbq);
    when others =>
        read_bus := multicast_filter_regaq(15 downto 0);
end case;
proc_request := ram_rd_strobeq or ram_wr_strobeq;
if holding_reg_strobeq = asserted_high then
    holding_wr_strobed <= asserted_high;
else
    holding_wr_strobed <= deasserted_low;
end if;
case req_arb_stateq is
        when idle =>
            next_addr(7 downto 0) := std_logic_vector'("00000000");
            if ftt_read_req = asserted_high then
                req_arb_state := gbi;
            elsif proc_request = asserted_high then
                req_arb_state := proc;
            else -- no requests
                req_arb_state := idle;
            end if;
        when gbi =>
            next_addr(7 downto 0) := ftt_vlan_id(7 downto 0);
            if ftt_read_req = asserted_high then
                req_arb_state := gbi;
            elsif proc_request = asserted_high then
                req_arb_state := proc;
            else -- no requests
                req_arb_state := idle;
            end if;
        when proc =>
            next_addr(7 downto 0) := pci_vfi_addr(7 downto 0);
            if ftt_read_req = asserted_high then
                req_arb_state := gbi;
            elsif proc_request = asserted_high then
                req_arb_state := proc;
            else -- no requests
                req_arb_state := idle;
            end if;
        when others =>
            next_addr(7 downto 0) := std_logic_vector'("00000000");
            req_arb_state := idle;
end case;
req_arb_stated <= req_arb_state;
multicast_mask := "00000000000000000";
multicast_valid := deasserted_low;
holding_reg_strobed <= deasserted_low;
holding_regad <= holding_regaq;
holding_regbd <= holding_regbq;
case vfi_stateq is
        when off =>
            wrenl := deasserted_high;
            if (req_arb_state = gbi) or ((req_arb_state = proc) and
                (ram_rd_strobeq = asserted_high)) then
                vfi_stated <= read;
            elsif (req_arb_state = proc) and
```

```
                    (ram_wr_strobeq = asserted_high) then
                        vfi_stated <= write;
                else
                        vfi_stated <= off;
                end if;
            when read =>
                wrenl := deasserted_high;
                if (req_arb_stateq = gbi) then
                        multicast_mask := vfr_data;
                        multicast_valid := asserted_high;
                elsif (req_arb_stateq = proc) then
                        holding_regad <= vfr_data(15 downto 0);
                        holding_regbd <= vfr_data(16);
                        holding_reg_strobed <= asserted_high;
                end if;
                if (req_arb_state = gbi) or ((req_arb_state = proc) and
                    (ram_rd_strobeq = asserted_high)) then
                        vfi_stated <= read;
                elsif (req_arb_state = proc) and
                    (ram_wr_strobeq = asserted_high) then
                        vfi_stated <= write;
                else
                        vfi_stated <= off;
                end if;
            when write =>
                wrenl := asserted_low;
                if (req_arb_state = gbi) or ((req_arb_state = proc) and
                    (ram_rd_strobeq = asserted_high)) then
                        vfi_stated <= read;
                elsif (req_arb_state = proc) and
                    (ram_wr_strobeq = asserted_high) then
                        vfi_stated <= write;
                else
                        vfi_stated <= off;
                end if;
            when others =>
                wrenl := deasserted_high;
                vfi_stated <= off;
end case;
if pci_vfr_rd_strobe = asserted_high then
    ram_rd_strobed <= asserted_high;
elsif req_arb_state = proc then
    ram_rd_strobed <= deasserted_low;
else
    ram_rd_strobed <= ram_rd_strobeq;
end if;
if pci_vfr_wr_strobe = asserted_high then
    ram_wr_strobed <= asserted_high;
elsif req_arb_state = proc then
    ram_wr_strobed <= deasserted_low,
else
    ram_wr_strobed <= ram_wr_strobeq;
end if;
if ((pci_gmc_enb = deasserted_low) and ((pci_ramtest_write = asserted_high)
    or (pci_ramtest_read_vfi = asserted_high))) then
    next_addr_sig <= ramtest_addrq(7 downto 0);
    if(ramtest_addrq(8) = '1') then
        ramtest_addrd <= ramtest_addrq;
    else
        ramtest addrd <= ramtest_addrq + '1';
    end if,
else
    next_addr_sig <= next_addr;
    ramtest_addrd <= "000000000";
end if;
if ((pci_gmc_enb = deasserted_low) and (pci_ramtest_write = asserted_high)) then
    out_data := ramtest_write_data;
    if (ramtest_addrq(8) = '0') then
        wrenl_or_clk := (isymclk or test_mode);
    else
        wrenl_or_clk := deasserted_high;
    end if;
else
    out_data := multicast_filter_regbq & multicast_filter_regaq;
    wrenl_or_clk := (wrenl or isymclk or test_mode);
end if,
if (test_mode = asserted_high) then
    mask_or_bypass := multicast_filter_regbq & multicast_filter_regaq;
else
    mask_or_bypass := multicast_mask;
```

-continued

```
end if;
vfi_data          <= out_data after 2 ns;
vfi_ramtest_data  <= vfr_data after 2 ns;
vfi_wrenl         <= wrenl_or_clk after 2 ns;
vfi_read_bus      <= read_bus after 2 ns;
vfi_multicast_valid <= multicast_valid after 2 ns;
vfi_multicast_mask  <= mask_or_bypass after 2 ns;
end process combo;
isymclk_rise : process
(isymclk)
begin
if (isymclk'event and isymclk = '1') then
    multicast_filter_regaq <= multicast_filter_regad;
    multicast_filter_regbq <= multicast_filter_regbd;
end if;
end process isymclk_rise;
isymclk_rise_clear : process
(isymclk,iresetl)
begin
if (iresetl = asserted_low) then
    ram_rd_strobeq <= deasserted_low;
    ram_wr_strobeq <= deasserted_low;
    holding_wr_strobeq <= deasserted_low;
    req_arb_stateq <= idle;
    vfi_stateq <= off;
    holding_regaq <= "0000000000000000";
    holding_regbq <= deasserted_low;
    holding_reg_strobeq <= deasserted_low;
    ramtest_addrq <= "000000000";
elsif (isymclk'event and isymclk = '1') then
    ram_rd_strobeq <= ram_rd_strobed;
    ram_wr_strobeq <= ram_wr_strobed;
    holding_wr_strobeq <= holding_wr_strobed;
    req_arb_stateq <= req_arb_stated;
    vfi_stateq <= vfi_stated;
    holding_regaq <= holding_regad;
    holding_regbq <= holding_regbd;
    holding_reg_strobeq <= holding_reg_strobed;
    ramtest_addrq <= ramtest_addrd;
end if;
end process isymclk_rise_clear;
latch_wraddr : process
(wrenl_in,
next_addr_sig,
test_mode,
iresetl)
begin
if (iresetl = asserted_low) then
    vfi_addr <= addr zero after 2 ns;
elsif ((test_mode = '1') OR (wrenl_in = '1')) then
    vfi_addr <= next_addr_sig after 2 ns;
end if,
end process latch_wraddr;
end behavior;
```

What is claimed is:

1. A virtual local area network (VLAN) memory access system comprising:

a memory lookup table having a read mode and a write mode for reading and writing said memory lookup table for one processing cycle;

a VLAN lookup process for and reading a VLAN ID field of an incoming VLAN packet, said VLAN lookup process using said VLAN ID field as a lookup address in said memory lookup table, said VLAN lookup process reading lookup data from said lookup address, said VLAN lookup process using said lookup data as a VLAN destination address for said VLAN packet;

a switch processor for controlling a switch in a VLAN, said switch processor reading and writing data to said memory lookup table to maintain and monitor said memory lookup table;

first state machine means for giving said VLAN lookup process next access to said mnemory lookup table when an incoming packet needs to be processed, said first state machine giving said switch processor next access to said memory lookup table when no packets need to be processed and said switch processor needs to access said memory lookup table, said first state machine blocking further access to said memory lookup table during said processing cycle when one of said VLAN lookup process and switch processor has access;

a second state machine placing said memory lookup table into said read mode for said processing cycle when one of said VLAN lookup process has accees to said memory lookup table, or said switch processor has access and needs to read said memory lookup table, said second state machine placing said memory lookup table into said write mode for said processing cycle when said switch processor has access to said memory lookup table and needs to write said memory lookup table.

2. A system in accordance with claim 1, wherein:

said VLAN lookup process generates a look-up signal when said VLAN lookup process needs to process said incoming packet;

said switch processor generates a processor request signal when said switch processor needs to read and write to said memory lookup table, said switch processor generates a read signal when said switch processor needs to read from said memory lookup table, said switch processor generates a write signal when said switch processor needs to write to said memory lookup table;

said first state machine includes an idle state, a look-up state, and a processor state, said first state machine going into said idle state when said look-up signal and said processor request signal are not present, said first state machine going into said look-up state when said look-up signal is present, said first state machine going into said processor state when said look-up signal is not present and said processor request signal is present;

a condition A being present when said look-up state is active or (said processor state is active and said read signal is present);

a condition B being present when said processor state is active and said write signal is present;

said second state machine includes an off state, a read state and a write state, said second state machine going into said read state when said condition A is present, said second state machine going into said write state when said condition A is not present and said condition B is present, said second state machine going into said off state when said conditions A and B are not present.

3. A system in accordance with claim 1, wherein:

said memory lookup table includes an address pointer, said address pointer is set equal to said VLAN ID field when said VLAN process has acces to said memory lookup table, said address pointer is set to a switch processor address when said switch procesor has access to said memory lookup table.

4. A system in accordance with claim 2, wherein:

said first and second state machines go into said idle state and into said off state during an undefined condition.

5. A system in accordance with claim 2, wherein:

only one of said idle, look-up and processor states are active at one time, and only one of said off, read and write states are active at one time.

6. A system in accordance with claim 2, further comprising:

a write signal for said memory access lookup table, said write signal being activated when said write state is activated, said write signal being deactivated when one of said off state and said read state are activated.

7. A system in accordance with claim 2, wherein:

when said read state and said look-up state are active, data is read from said memory lookup table to a multicast_mask location;

when said read state and said processor state are active, data is read from said memory lookup table to a holding register.

8. A method for accessing memory locations in a VLAN switch, the method comprising:

providing a memory lookup table;

reading a VLAN ID field of an incoming VLAN packet;

using said VLAN ID field as a lookup address in said memory lookup table;

reading lookup data from said lookup address;

using said lookup data as a VLAN destination address for said VLAN packet;

generating a look-up signal when said VLAN lookup process needs to process said incoming packet;

providing a switch processor for controlling the VLAN switch;

said switch processor reading and writing data to said memory lookup table to maintain and monitor said memory lookup table;

said switch processor generating a processor request signal when said switch processor reads and writes to said memory lookup table;

said switch processor generating a read signal when said switch processor needs to read from said memory lookup table;

said switch processor generating a write signal when said switch processor needs to write to said memory lookup table;

activating an idle state when said look-up signal and said processor request signal are not present;

activating a look-up state when said look-up signal is present;

activating a processor state when said look-up signal is not present and said processor request signal is present;

condition A being present when said look-up state is active or (said processor state is active and said read signal is present);

condition B being present when said processor state is active and said write signal is present;

activating a read state when said condition A is present;

activating a write state when said condition A is not present and said condition B is present, activating an off state when said conditions A and B are not present.

9. A method in accordance with claim 8, wherein:

an address pointer is provided in said memory lookup table;

setting said address pointer equal to said VLAN ID field when said look-up state is active;

setting said address pointer to a switch processor address when said processor state is active.

10. A method in accordance with claim 8, wherein:

activating said idle state and said off state during an undefined condition.

11. A method in accordance with claim 8, wherein:

only one of said idle, look-up and processor states are activated at one time, and only one of said off, read and write states are activated at one time.

12. A method in accordance with claim 8, further comprising:

activating a write signal for said memory access lookup table when said write state is activated;

deactivating said write signal when one of said off state and said read state are activated.

13. A method in accordance with claim 8, wherein:

reading data from said memory lookup table to a multicast_mask location when said read state and said look-up state are active;

reading data from said memory lookup table to a holding register when said read state and said processor state are active.

14. A VLAN switch comprising:

a memory lookup table;

VLAN controller means for reading a VLAN ID field of an incoming VLAN packet, said VLAN controller means using said VLAN ID field as a lookup address in said memory lookup table, said VLAN controller means reading lookup data from said lookup address, said VLAN controller means using said lookup data as a VLAN destination address for said VLAN packet, said VLAN controller means generating a look-up signal when said VLAN controller means needs to process said incoming packet;

a switch processor for controlling a switch in a VLAN, said switch processor reading and writing data to said memory lookup table to maintain and monitor said memory lookup table, said switch processor generating a processor request signal when said switch processor reads and writes to said memory lookup table, said switch processor generates a read signal when said switch processor needs to read from said memory lookup table, said switch processor generates a write signal when said switch processor needs to write to said memory lookup table;

a first state machine including an idle state, a look-up state, and a processor state, said first-state machine going into said idle state when said look-up signal and said processor request signal are both not present, said first state machine going into said look-up state when said look-up signal is present, said first-state machine going into said processor state when said look-up signal is not present and said processor request signal is present;

a condition A being present when said look-up state is active or (said processor state is active and said read signal is present);

a condition B being present when said processor state is active and said write signal is present;

a second state machine including an off state, a read state and a write state, said second state machine going into said read state when said condition A is present, said second state machine going into said write state when said condition A is not present and said condition B is present, said second state machine going into said off state when said conditions A and B are not present.

15. A VLAN switch in accordance with claim 14, wherein:

said memory lookup table includes an address pointer, said address pointer is set equal to said VLAN ID field when said first state machine is in said look-up state, said address pointer is set to a switch processor address when said first state machine is in said processor state.

16. A VLAN switch in accordance with claim 14, wherein:

the VLAN memory access system goes into said idle state and into said off state during an undefined condition.

17. A VLAN switch in accordance with claim 14, wherein:

only one of said idle, look-up and processor states are active at one time, and only one of said off, read and write states are active at one time.

18. A VLAN switch in accordance with claim 14, further comprising:

a write signal for said memory access lookup table, said write signal being activated when said write state is activated, said write signal being deactivated when one of said off state and said read state are activated.

19. A VLAN switch in accordance with claim 14, wherein:

when said read state and said look-up state are active, data is read from said memory lookup table to a multicast_ mask location;

when said read state and said processor state are active, data is read from said memory lookup table to a holding register.

* * * * *